(No Model.)
W. DE FREESE & T. E. NICHOLSON.
SLACK ADJUSTER.
No. 540,956. Patented June 11, 1895.
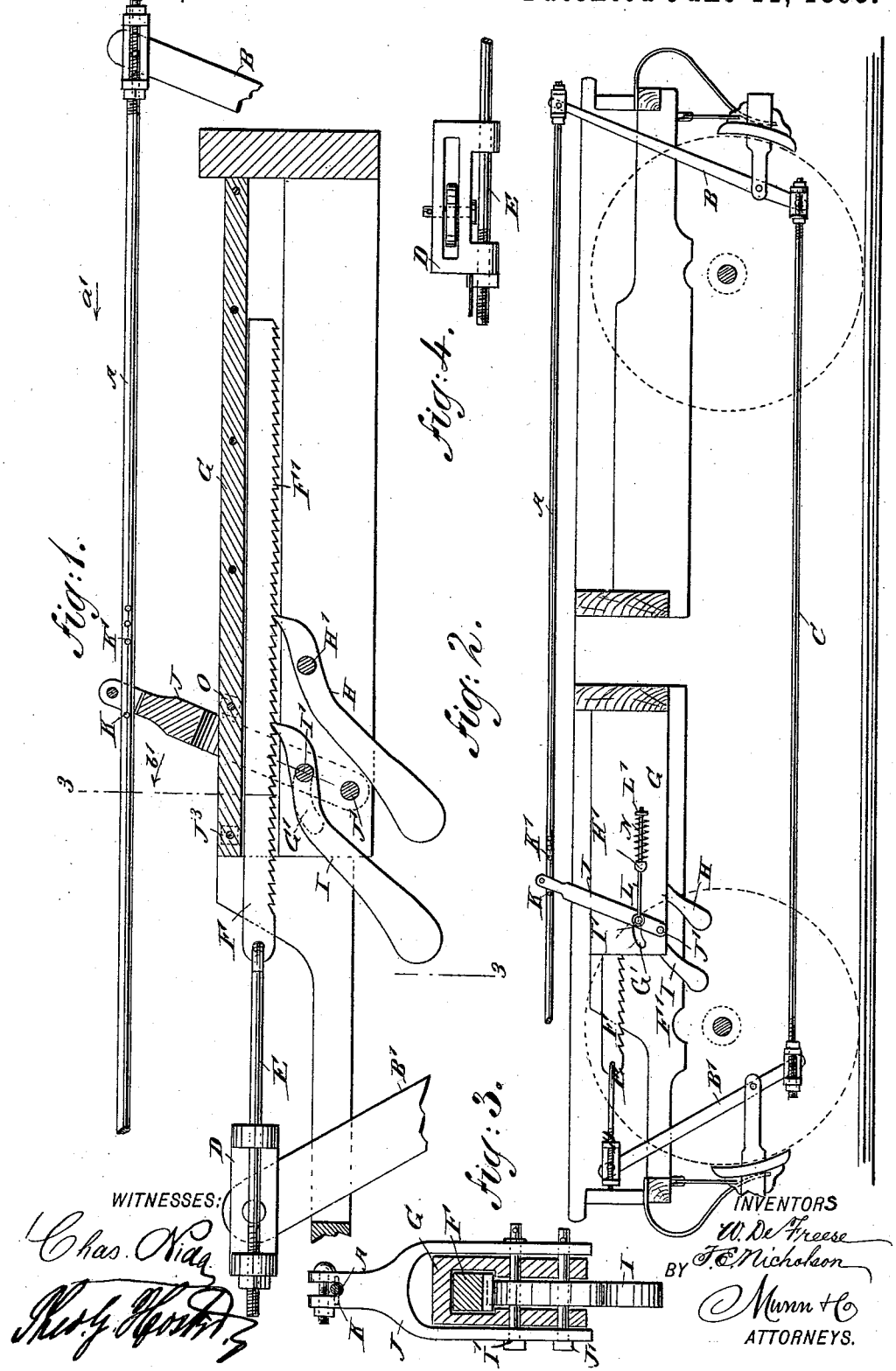
WITNESSES:
Chas. Nida
Theo. G. Hoskin
INVENTORS
W. De Freese
T. E. Nicholson
BY Munn & Co
ATTORNEYS.

UNITED STATES PATENT OFFICE.

WILLIAM DE FREESE AND THOMAS ERNEST NICHOLSON, OF ST. PAUL, MINNESOTA.

SLACK-ADJUSTER.

SPECIFICATION forming part of Letters Patent No. 540,956, dated June 11, 1895.

Application filed February 12, 1895. Serial No. 538,073. (No model.)

*To all whom it may concern:*

Be it known that we, WILLIAM DE FREESE and THOMAS ERNEST NICHOLSON, of St. Paul, in the county of Ramsey and State of Minnesota, have invented a new and Improved Slack-Adjuster, of which the following is a full, clear, and exact description.

The invention relates to fluid pressure brakes; and its object is to provide a new and improved slack adjuster, designed to automatically take up all the slack in the brake mechanism caused by wear of brake shoes, to permit a uniform travel of the piston in the brake cylinder, so as to insure a full, effective pressure in the air brake cylinder at the time the brakes are applied.

The invention consists principally of a toothed bar adapted to be connected with a brake lever, and means for adjusting the position of the brake controlled from the brake rod.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the views.

Figure 1 is a sectional side elevation of the improvement. Fig. 2 is a reduced side elevation of the improvement as applied, with part of the car in section. Fig. 3 is a transverse section of the improvement on the line 3 3 of Fig. 1, and Fig. 4 is a plan view of the connection between the brake-lever and the toothed bar.

The brake lever A, of the ordinary brake mechanism, is connected at one end in the usual manner with the piston in the brake cylinder, and at its other end with the brake lever B, connected by a link C with the dead brake lever B'. The brake levers B and B' are connected in the usual manner with the brake shoes, and the upper end of the dead brake lever B' is pivotally connected with a head D in which is held adjustable a rod E, connected with a bar F extending longitudinally, and fitted to slide in suitable bearings formed in a casing G attached to the timbers of the car truck, directly below the brake rod A.

The bar F is provided at its under side with teeth F', engaged by two gravity dogs H and I, of which the dog H has its fulcrum H' in the casing G, and the fulcrum I' of the dog I extends through slots G', into the said casing G, to engage the forked ends of a lever J, fulcrumed at its lower end at J' on the casing G. See Figs. 1 and 3. Through the free, upper end of the lever J passes loosely the brake rod A, the latter, however, being provided on opposite sides of the lever J with lugs or pins K and K', of which the pin K' can be placed in one of a series of apertures in the rod A, as plainly indicated in Figs. 1 and 2.

The lever J is pivotally connected with a rod L, fitted to slide loosely in one outer end of the fulcrum H' and on this rod L is coiled a spring N, resting with one end on the fulcrum H', and at its other end on a nut L', secured on the end of the rod L. This spring N serves to hold the lever J normally in the position shown in Figs. 1 and 2; that is, with the lever J resting against the stop O, secured on the casing G.

The operation is as follows: When a pull is exerted on the brake rod A in the direction of the arrow $a'$ to apply the brakes, then the position of the lever J is not disturbed as long as the brake mechanism is in proper order and the piston in the brake cylinder travels the regular stroke, but when by wear of the brake shoes or from other causes, a slack exists and the piston in the brake cylinder has to travel beyond its normal stroke, the brake rod A is drawn or pulled a greater distance to properly apply the brakes. Then the pin K' in the brake rod A engages the free end of the lever J and swings the latter in the direction of the arrow $b'$, whereby the dog I engages the next following tooth or teeth and as soon as the brakes are released, then the spring-pressed rod K pulls the lever J back to its normal position against the stop O, whereby the dog I pushes the bar F in the inverse direction of the arrow $a'$ the distance of one or two teeth, thereby causing the dog H to engage one or two teeth farther to the left on the bar F. By this movement of the bar F any existing slack in the brake mechanism is taken up, owing to the pull exerted by the bar F and rod E on the upper end of the dead brake lever B'.

It will be seen that by the arrangement described, no attention whatever need be given to this adjuster, as the latter automatically takes up any slack in the brake mechanism, and consequently the piston in the brake cylinder will travel at all times its normal stroke, and therefore full, effective pressure in the air brake cylinder is insured whenever the brakes are applied. The bar F is made sufficiently long to take up all slack until the brake shoes are completely worn out and must be replaced by new ones.

Having thus fully described our invention, we claim as new and desire to secure by Letters Patent—

1. A device of the kind described, comprising a toothed bar fitted to slide longitudinally in suitable bearings and adjustably connected with the dead brake lever, dogs engaging the said toothed bar to hold it in position, and a spring pressed lever controlled from the brake rod and carrying one of the said dogs, substantially as shown and described.

2. A device of the class described, comprising a toothed bar fitted to slide longitudinally in suitable bearings, a dead brake lever, a head pivotally connected with the said dead brake lever, a rod adjustable in the said head and connected with the toothed bar, a spring pressed lever adapted to be moved by the brake rod, a dog held on the said lever and engaging the toothed bar, and a second dog engaging the said bar, substantially as shown and described.

3. A device of the class described, comprising a bar fitted to slide longitudinally in a suitable casing and provided at its under side with teeth, the said bar being connected with the dead brake lever, a forked lever fulcrumed at its lower end in the said casing and adapted to be moved by the brake rod, a dog having its fulcrum extending through slots in the casing and engaging the forked ends of the lever above its fulcrum, a second dog fulcrumed in the casing and engaging the said toothed bar, and a spring pressed rod pivotally connected with the said lever, substantially as shown and described.

WILLIAM DE FREESE.
THOMAS ERNEST NICHOLSON.

Witnesses:
WILLIAM H. CAROTHERS,
GEORGE R. HAZZARD.